(12) United States Patent
Weiss et al.

(10) Patent No.: US 8,986,655 B2
(45) Date of Patent: Mar. 24, 2015

(54) COMPOSITIONS, DEVICES, AND METHODS RELATED TO PROSTATE-SPECIFIC MEMBRANE ANTIGEN

(75) Inventors: Gregory A. Weiss, Irvine, CA (US); Jessica Arter, Irvine, CA (US); Juan E. Diaz, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 679 days.

(21) Appl. No.: 13/321,011

(22) PCT Filed: May 19, 2010

(86) PCT No.: PCT/US2010/035410
§ 371 (c)(1),
(2), (4) Date: Mar. 13, 2012

(87) PCT Pub. No.: WO2010/135431
PCT Pub. Date: Nov. 25, 2010

(65) Prior Publication Data
US 2012/0183478 A1     Jul. 19, 2012

Related U.S. Application Data

(60) Provisional application No. 61/179,609, filed on May 19, 2009.

(51) Int. Cl.
| | |
|---|---|
| *A61B 5/00* | (2006.01) |
| *G01N 33/50* | (2006.01) |
| *A61K 38/08* | (2006.01) |
| *A61K 38/10* | (2006.01) |
| *H01M 4/66* | (2006.01) |
| *H01M 4/72* | (2006.01) |
| *H01M 4/73* | (2006.01) |
| *H01M 10/18* | (2006.01) |
| *H01M 4/68* | (2006.01) |

(52) U.S. Cl.
CPC .............. *H01M 4/661* (2013.01); *H01M 4/667* (2013.01); *H01M 4/668* (2013.01); *H01M 4/72* (2013.01); *H01M 4/73* (2013.01); *H01M 10/18* (2013.01); *H01M 4/685* (2013.01); *Y02E 60/126* (2013.01)
USPC ............. 424/9.34; 424/9.1; 424/9.4; 424/9.5; 435/7.1; 435/188; 530/300; 530/327; 530/328

(58) Field of Classification Search
None
See application file for complete search history.

(56) References Cited

U.S. PATENT DOCUMENTS

| | | |
|---|---|---|
| 7,666,414 B2 | 2/2010 | Bander |
| 7,666,425 B1 | 2/2010 | Bander |
| 2005/0158780 A1 | 7/2005 | Lupold et al. |
| 2005/0245486 A1 | 11/2005 | Frangioni |
| 2007/0020278 A1 | 1/2007 | Ross et al. |
| 2007/0254316 A1 | 11/2007 | Rodriguez et al. |
| 2008/0081768 A1 | 4/2008 | Watt et al. |
| 2008/0175789 A1 | 7/2008 | Frangioni |
| 2008/0193381 A1 | 8/2008 | Babich et al. |
| 2008/0311037 A1 | 12/2008 | Heston et al. |
| 2009/0092965 A1 | 4/2009 | Weiss et al. |
| 2009/0105172 A1 | 4/2009 | Diener et al. |
| 2009/0297438 A1 | 12/2009 | Huang et al. |

FOREIGN PATENT DOCUMENTS

| | | |
|---|---|---|
| WO | 2006/028429 | 3/2006 |
| WO | 2006/093991 | 9/2006 |
| WO | 2006/096745 | 9/2006 |
| WO | 2007/104058 | 9/2007 |
| WO | 2007/137117 | 11/2007 |
| WO | 2009/002529 | 12/2008 |
| WO | 2009/026177 | 2/2009 |
| WO | 2009/046294 | 4/2009 |
| WO | 2009/127046 | 10/2009 |
| WO | 2010/014933 | 2/2010 |
| WO | 2010/027513 | 3/2010 |
| WO | 2010/037836 | 4/2010 |
| WO | 2010/045598 | 4/2010 |

OTHER PUBLICATIONS

Sequence of NCBI WP_003030787.1 (May 2013), provided with BLAST comparison to core of SEQ ID No. 2.*
Andersson, J.O. et al., "Pseudogenes, Junk DNA, and the Dynamics of *Rickettsia* Genomes", Department of Molecular Evolution, University of Uppsala, Sweden, 2001.
Kaneko, T. et al., "Complete Genomic Structure of the Bloom-forming Toxic Cyanobacterium *Microcystic aeruginosa* NIES-843", DNA Research, vol. 14, pp. 247-256, 2007.
Matthijnssens, J. et al., "Full Genome-Based Classification of Rotaviruses Reveals Common Origin between Human Wa-like and Porcine rotavirus strains and Human DS-1-like and Bovine Rotavirus Strains", American Society for Microbiology, 2008.
Myers, G.S.A. et al., "Skewed genomic variability in strains of the toxigenic bacterial pathogen, *Clostridium perfingens*", Genome Research, vol. 16, pp. 1031-1040, Cold Spring Harbor Laboratory Press, 2006.
Ward, et al., "EMBL accession #A3JDN2", 2010, http://www.uniprot.org/uniprot/A3JDN2.
Yang, L.M.C. et al., "Direct Electrical Transduction of Antibody Binding to a Covalent Virus Layer Using Electrochemical Impedance", Analytical Chemistry, vol. 80, No. 15, pp. 5695-5705, 2008.

* cited by examiner

*Primary Examiner* — Karlheinz R Skowronek
*Assistant Examiner* — Joseph Fischer
(74) *Attorney, Agent, or Firm* — Fish & Tsang, LLP

(57) ABSTRACT

PSMA ligands, compositions, and methods therefore are disclosed where the ligand is a peptide having the sequence $X_1X_2CVEVX_3QNSCX_4X_5$ where $X_1$-$X_5$ are independently a natural or non-natural amino acid or a peptide having the sequence CALCEFLG [SEQ ID NO: 1]. Especially preferred aspects include diagnostic reagents for detection and/or quantification of PSMA in a sample, therapeutic reagents, and diagnostic imaging reagents.

18 Claims, 3 Drawing Sheets

SEQUENCE LISTING

<160> NUMBER OF SEQ ID NOS: 13

<210> SEQ ID NO 1
<211> LENGTH: 8

```
<212> TYPE: PRT
<213> ORGANISM: Artificial
<220> FEATURE:
<223> OTHER INFORMATION: Synthetic oligopeptiide

<400> SEQUENCE: 1

Cys Ala Leu Cys Glu Phe Leu Gly
1               5

<210> SEQ ID NO 2
<211> LENGTH: 13
<212> TYPE: PRT
<213> ORGANISM: Artificial
<220> FEATURE:
<223> OTHER INFORMATION: Synthetic oligopeptide
<220> FEATURE:
<221> NAME/KEY: MISC_FEATURE
<222> LOCATION: (1)..(1)
<223> OTHER INFORMATION: Xaa is any amino acid, preferably an amino
      acid with a linear side chain, most preferably serine or leucine
<220> FEATURE:
<221> NAME/KEY: MISC_FEATURE
<222> LOCATION: (2)..(2)
<223> OTHER INFORMATION: Xaa is an amino acid, preferably an amino
      acid with a polar and charged side chain, most preferably aspartic
      acid or glutamic acid
<220> FEATURE:
<221> NAME/KEY: MISC_FEATURE
<222> LOCATION: (7)..(7)
<223> OTHER INFORMATION: Xaa is an amino acid, preferably an amino acid
      with an aromatic and uncharged moiety in the side chain, most
      preferably phenylalanine or tyrosine
<220> FEATURE:
<221> NAME/KEY: MISC_FEATURE
<222> LOCATION: (12)..(12)
<223> OTHER INFORMATION: Xaa is an amino acid, preferably an amino acid
      with a charged side chain, most preferably aspartic acid or
      glutamic acid
<220> FEATURE:
<221> NAME/KEY: MISC_FEATURE
<222> LOCATION: (13)..(13)
<223> OTHER INFORMATION: Xaa is an amino acid, preferably an amino acid
      with a non-polar and a hydrophobic side chain, most preferably
      leucine or tryptophan

<400> SEQUENCE: 2

Xaa Xaa Cys Val Glu Val Xaa Gln Asn Ser Cys Xaa Xaa
1               5                   10

<210> SEQ ID NO 3
<211> LENGTH: 13
<212> TYPE: PRT
<213> ORGANISM: Artificial
<220> FEATURE:
<223> OTHER INFORMATION: Synthetic oligopeptide

<400> SEQUENCE: 3

Leu Asp Cys Val Glu Val Phe Gln Asn Ser Cys Asp Trp
1               5                   10

<210> SEQ ID NO 4
<211> LENGTH: 13
<212> TYPE: PRT
<213> ORGANISM: Artificial
<220> FEATURE:
<223> OTHER INFORMATION: Synthetic oligopeptide

<400> SEQUENCE: 4

Ser Glu Cys Val Glu Val Phe Gln Asn Ser Cys Asp Trp
1               5                   10
```

```
<210> SEQ ID NO 5
<211> LENGTH: 13
<212> TYPE: PRT
<213> ORGANISM: Artificial
<220> FEATURE:
<223> OTHER INFORMATION: Synthetic oligopeptide

<400> SEQUENCE: 5

Ser Asp Cys Val Glu Val Phe Gln Asn Ser Cys Asp Trp
1               5                   10

<210> SEQ ID NO 6
<211> LENGTH: 13
<212> TYPE: PRT
<213> ORGANISM: Artificial
<220> FEATURE:
<223> OTHER INFORMATION: Synthetic oligopeptide

<400> SEQUENCE: 6

Leu Glu Cys Val Glu Val Tyr Gln Asn Ser Cys Glu Trp
1               5                   10

<210> SEQ ID NO 7
<211> LENGTH: 13
<212> TYPE: PRT
<213> ORGANISM: Artificial
<220> FEATURE:
<223> OTHER INFORMATION: Synthetic oligopeptide

<400> SEQUENCE: 7

Ser Glu Cys Val Glu Val Phe Gln Asn Ser Cys Glu Leu
1               5                   10

<210> SEQ ID NO 8
<211> LENGTH: 13
<212> TYPE: PRT
<213> ORGANISM: Artificial
<220> FEATURE:
<223> OTHER INFORMATION: Synthetic oligopeptide

<400> SEQUENCE: 8

Ser Asp Cys Val Glu Val Tyr Gln Asn Ser Cys Asp Trp
1               5                   10

<210> SEQ ID NO 9
<211> LENGTH: 4
<212> TYPE: PRT
<213> ORGANISM: Artificial
<220> FEATURE:
<223> OTHER INFORMATION: Protease cleavage site
<220> FEATURE:
<221> NAME/KEY: MISC_FEATURE
<222> LOCATION: (1)..(4)
<223> OTHER INFORMATION: Protease cleavage site

<400> SEQUENCE: 9

Ile Glu Gly Arg
1

<210> SEQ ID NO 10
<211> LENGTH: 5
<212> TYPE: PRT
<213> ORGANISM: Artificial
<220> FEATURE:
<223> OTHER INFORMATION: DDDDK
<220> FEATURE:
<221> NAME/KEY: MISC_FEATURE
<222> LOCATION: (1)..(5)
<223> OTHER INFORMATION: Protease cleavage site
```

```
<400> SEQUENCE: 10

Asp Asp Asp Asp Lys
1               5

<210> SEQ ID NO 11
<211> LENGTH: 6
<212> TYPE: PRT
<213> ORGANISM: Artificial
<220> FEATURE:
<223> OTHER INFORMATION: LVPRGS
<220> FEATURE:
<221> NAME/KEY: MISC_FEATURE
<222> LOCATION: (1)..(6)
<223> OTHER INFORMATION: Protease cleavage site

<400> SEQUENCE: 11

Leu Val Pro Arg Gly Ser
1               5

<210> SEQ ID NO 12
<211> LENGTH: 7
<212> TYPE: PRT
<213> ORGANISM: Artificial
<220> FEATURE:
<223> OTHER INFORMATION: ENLYFQG
<220> FEATURE:
<221> NAME/KEY: MISC_FEATURE
<222> LOCATION: (1)..(7)
<223> OTHER INFORMATION: Protease cleavage site

<400> SEQUENCE: 12

Glu Asn Leu Tyr Phe Gln Gly
1               5

<210> SEQ ID NO 13
<211> LENGTH: 8
<212> TYPE: PRT
<213> ORGANISM: Artificial
<220> FEATURE:
<223> OTHER INFORMATION: Protease cleavage site
<220> FEATURE:
<221> NAME/KEY: MISC_FEATURE
<222> LOCATION: (1)..(8)
<223> OTHER INFORMATION: Protease cleavage site

<400> SEQUENCE: 13

Leu Glu Val Leu Phe Gln Gly Pro
1               5
```

COMPOSITIONS, DEVICES, AND METHODS RELATED TO PROSTATE-SPECIFIC MEMBRANE ANTIGEN

This application claims priority to copending U.S. provisional application with the Ser. No. 61/179,441, which was filed May 19, 2009, which is hereby incorporated by reference in its entirety.

This invention was made, in part, by United States Government support of Grant 1R43CA11955-01 awarded by the National Institutes of Health. The United States Government may have certain rights in this invention.

FIELD OF THE INVENTION

The field of the invention is high-affinity prostate-specific membrane antigen (PSMA) ligand motifs and ligands, compositions comprising same, and methods therefor.

BACKGROUND OF THE INVENTION

PSMA has received considerable attention since its discovery (Horoszewicz et al. (1987) Anticancer Res. 7:927-35), mostly due to its specifically elevated expression by malignant prostate cells (Israeli et al. (1994) Cancer Res. 54:1807-11; Wright et al. (1996) Urology 48:326-34). Moreover, normal prostate cells predominantly express the cytosolic form while malignant cells express the full-length membrane bound form (Su et al. (1995) Cancer Res. 55:1441-3). PSMA expression was also reported, albeit at lower levels, in the brain, kidney, salivary gland and duodenum. (e.g. Renneberg et al. (1999) Urol. Res. 27(1):23-7; Troyer et al. (1995) Int. J. Cancer 62(5):552-8; Israel et al. (1994) Cancer Res. 54(7): 1807-11; Israel et al. (1993) Cancer Res. 53(2):227-30). These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply PSMA is a 750-amino acid type II transmembrane protein with carboxypeptidase activity (specificity: N-acetyl-asp-glu). Remarkably, the majority of the protein is present in the extracellular space and so forms an attractive target for diagnostic and therapeutic agents. For example, monoclonal antibodies can be raised against PSMA and modified for use in diagnostic imaging (Sodee et al. (1998) Prostate 37:140-8; Lopes et al. (1990) Cancer Res. 50:6423-6429; Elgamal et al. (1998) Prostate 37(4):261-9; Lamb and Faulds (1998) Drugs Aging 12(4):293-304). Since PSMA is also expressed in neovascular endothelial cells in a variety of cancers (Chang et al. (1999) Clin. Cancer Res. 5:2674-81; Liu et al. (1997) Cancer Res. 57:3629-34), PSMA antibodies can also be used in tumor vascular imaging and anti-angiogenesis therapy. However, in vivo use of monoclonal antibodies is often limited to due various factors. Most significantly, antibodies are relatively large molecules and often problematic in terms of large-scale production and isolation. Moreover, and especially where antibodies are used over an extended period, many antibodies will ultimately elicit an immune response. Still further, even though most antibodies have fairly strong affinity towards their antigen, the high molecular weights of antibodies requires relatively large dosages for tagging or otherwise labeling cells with antibodies.

To circumvent problems associated with antibodies, antibody fragments or single chain variable chain fragments (scFvs) can be employed. While such approaches advantageously reduce the molecular weight and in at least some instances overcome limited production volume, numerous problems nevertheless remain. Among other things, purification of scFvs is typically performed from a recombinant source, which introduces a new set of potentially antigenic components. Alternatively, where antibody fragments are used, (e.g., Fab or F(ab')2), protease activity is often carried over to the preparation of antibody fragments, which is highly undesirable.

Alternatively, non-antibody ligands can be used as described in U.S. Pat. No. 6,933,114 where high-affinity RNA aptamers were produced in a SELEX (Systematic Evolution of Ligands by EXponential Enrichment) process to so generate binders to PSMA. Remarkably, the inventors reported various high-affinity nuclease resistant RNA sequences that inhibited (at low nM Ki) the peptidase activity of PSMA. While such molecules overcome at least some of the difficulties associated with antibodies, other problems tend to arise. For example, as such RNA aptamers are often relatively long RNA molecules (e.g., 65-70 bases, and even longer), conformational changes may reduce utility of such molecules. Further, and at least in most in vivo conditions, large RNA molecules are typically bound or otherwise associated with various serum proteins and so rendered ineffective for binding to PSMA, particularly where nucleic acid analogs are used (e.g., phosphorothioate) to stabilize the molecule against degradation.

Thus, while numerous PSMA ligands are known in the art, there is still a need to provide improved PSMA ligand motifs and/or ligands, compositions, and methods using such improved PSMA ligand motifs and/or ligands.

SUMMARY OF THE INVENTION

The present inventive subject matter is directed towards compositions and methods using novel PSMA ligand motifs and/or ligands, which are most typically peptide ligands and/or peptidomimetic ligands. Especially preferred PSMA ligand motifs and/or ligands comprise a core motif with typically 13 amino acid residues, of which several positions may be altered, preferably using homologous amino acid exchange.

Among other advantages, the PSMA ligand motifs and/or ligands contemplated herein exhibit significantly higher affinity to the prostate-specific membrane antigen than heretofore known PSMA ligands and are therefore particularly suitable in the manufacture of high-specificity ligand motifs and/or ligands for in vivo use. Depending on the specific structure, contemplated PSMA ligand motifs and/or ligands will preferentially bind to the monomeric form or the dimeric form, and may thus act as a neutral ligand, as an agonist, or as an antagonist of the PSMA catalytic function. Consequently, it should be appreciated that the PSMA ligand motifs and/or ligands presented herein may be employed as diagnostic or therapeutic agents, and/or as a research tool (e.g., in SAR studies).

In a first aspect, the invention provides peptide PSMA binding moieties having a sequence that preferentially binds a monomeric PSMA relative to dimeric PSMA. In a related aspect, the invention provides peptide binding moieties having a sequence that preferentially binds a dimeric PSMA relative to monomeric PSMA.

Especially preferred PSMA ligand motifs and/or ligands comprise a recombinant, an isolated, or a synthetic peptide having the sequence $$X_1X_2CVEVX_3QNSCX_4X_5 \quad \text{[SEQ ID NO: 2]}$$

wherein $X_1$ to $X_5$ are independently a natural amino acid or a non-natural amino acid. Such ligand motifs and/or ligands may be further modified and may further include a protecting group, a linker, or other functional or structural moiety. Among other uses, it is contemplated that the ligand motifs and/or ligands according to the inventive subject matter are particularly useful as diagnostic agents and/or therapeutic agents.

Preferably, and independently, $X_1$ is an amino acid with a linear side chain, $X_2$ and $X_4$ are independently an amino acid with a charged side chain, $X_3$ is an amino acid with an aromatic moiety the side chain, and $X_5$ is an amino acid with a non-polar and a hydrophobic side chain, and even more preferably, $X_1$ is an amino acid with a linear and uncharged side chain, $X_2$ and $X_4$ are independently an amino acid with a polar and charged side chain, X3 is an amino acid with an aromatic and uncharged moiety in the side chain, and $X_5$ is an amino acid with a non-polar and hydrophobic side chain. In still further preferred aspects, $X_1$ is serine or leucine, $X_2$ and $X_4$ are independently aspartic acid or glutamic acid, $X_3$ is phenylalanine or tyrosine, and $X_5$ is leucine or tryptophan. Thus, in various embodiments, suitable first PSMA binding moieties include

LDCVEVFQNSCDW, [SEQ ID NO: 3]

SECVEVFQNSCDW, [SEQ ID NO: 4]

SDCVEVFQNSCDW, [SEQ ID NO: 5]

LECVEVYQNSCEW, [SEQ ID NO: 6]

SECVEVFQNSCEL, and [SEQ ID NO: 7]

SDCVEVYQNSCDW. [SEQ ID NO: 8]

Other preferred PSMA binding moieties include CALCEFLG [SEQ ID NO: 1].

In another aspect of the inventive subject matter, a diagnostic reagent for detection and/or quantification of PSMA in a sample will include a first PSMA binding moiety and a solid carrier or detectable moiety, wherein (a) the first PSMA binding moiety is coupled to the solid carrier, or (b) wherein the first PSMA binding moiety is coupled to or part of the detectable moiety. In especially preferred aspects, the first PSMA binding moiety is a recombinant or synthetic peptide having a sequence $X_1X_2CVEVX_3QNSCX_4X_5$ [SEQ ID NO: 2], wherein $X_1$ to $X_5$ are independently a natural amino acid or a non-natural amino acid.

It is further contemplated that the diagnostic reagent may further comprise a second PSMA binding moiety, and in certain embodiments the second PSMA binding moieties include CALCEFLG [SEQ ID NO: 1], LDCVEVFQNSCDW [SEQ ID NO: 3], SECVEVFQNSCDW [SEQ ID NO: 4], SDCVEVFQNSCDW [SEQ ID NO: 5], LECVEVYQNSCEW [SEQ ID NO: 6], SECVEVFQNSCEL [SEQ ID NO: 7], and SDCVEVYQNSCDW [SEQ ID NO: 8]. Viewed from a different perspective, the first PSMA binding moiety may have a sequence that preferentially binds a monomeric PSMA, while the second PSMA binding moiety may have a sequence that preferentially binds a dimeric PSMA.

In certain embodiments, one or more peptides of the present invention may be modified by covalent or non-covalent coupling to one or more additional species. These additional species include, but are not limited to, polypeptides, lipids, nucleic acids, cross-linkers, solid phases, contrast agents, toxins, detectable labels, etc. Such coupling may be direct (e.g, a peptide of the invention may be coupled via a peptide bond to an additional polypeptide sequence) or indirect (e.g., a peptide of the invention may be coupled via a linkage chemistry to a solid phase). In the case of non-covalent coupling, one or more peptides of the present invention may be coupled to one or more additional species by electrostatic and/or hydrophobic interactions. In the case of covalent coupling, a covalent bond may be formed between a peptide of the present invention and one or more additional species at the amino terminus, carboxyl terminus, and/or a side chain of the peptide.

In certain embodiments, a plurality of peptides according to the claimed invention may be coupled to one another and/or to one or more additional species to provide a multivalent binding reagent comprising a plurality of PSMA binding ligands. Two or more binding interactions taking place within the same molecular complex have particularly large effects on the dissociation kinetics ($k_{off}$), as all interactions must be broken simultaneously before dissociation can take place. The gain in apparent affinity through the avidity effect is substantial for a complex with bivalent interaction but may be still increased by increasing the number of interactions.

In certain embodiments, one or more peptides of the present invention may comprise an additional peptide sequence, such as an affinity marker, detection marker, and/or protease cleavage site. Examples of such affinity/detection markers include, but are not limited to, glutathione S-transferase (GST), maltose binding protein (MBP), thioredoxin (Trx), calmodulin binding peptide (CBP), poly-His, FLAG, c-myc, and hemagglutinin (HA). GST, MBP, Trx, CBP, and poly-His enable purification of their cognate fusion proteins on immobilized glutathione, maltose, phenylarsine oxide, calmodulin, and metal-chelate resins, respectively. FLAG, c-myc, and hemagglutinin (HA) enable immunoaffinity purification of fusion proteins using commercially available monoclonal and polyclonal antibodies that specifically recognize these epitope tags. Other suitable tag sequences will be apparent to those of skill in the art. Likewise, numerous proteolytic enzymes (e.g., trypsin, subtilisin, thermolysin, chymotrypsin, papain, etc.) and corresponding protease cleavage sites are known to those of skill in the art. In preferred embodiments, one or more proteolytic enzymes for use in the present methods are selected from the group consisting of factor Xa, enterokinase, thrombin, tobacco etch virus protease, and human rhinovirus 3C protease. In yet other preferred embodiments, an introduced protease cleavage site is selected from the group consisting of IEGR [SEQ ID NO.9], DDDDK [SEQ ID NO.10], LVPRGS [SEQ ID NO.11], ENLYFQG [SEQ ID NO.12], and LEVLFQGP [SEQ ID NO.13].

The peptides of the present invention may be chemically synthesized or expressed using recombinant DNA methodology. In various embodiments, one or more peptides of the present invention are expressed as part of a fusion protein with an additional polypeptide sequence. Such recombinant proteins may comprise sequences selected from the group consisting of a viral envelope protein, a viral coat protein, a bacterial outer membrane protein, and a eukaryotic membrane protein. Methods for covalently linking a PMSA binding moiety to a target such as a detectable moiety, solid phase, etc., are well known in the art. Chemical cross-linkers are discussed in numerous books and catalogues. See, e.g., Wong, Chemistry of Protein Conjugation and Cross-linking, CRC Press, Boca Raton, Fla., 1991. These reagents often employ functional groups that couple to amino acid side chains of peptides. Moieties that can be targeted using a cross-linker include primary and ε-amines, sulfhydryls, carbonyls, hydroxyls, and carboxylic acids. In addition, many reactive groups can be coupled nonselectively using a cross-linker such as photoreactive phenyl azides.

In another aspect, the peptides of the present invention are used in a variety of diagnostic compositions and methods as binding ligands for PSMA. For example, the PSMA binding ligands of the present invention may be used in various sandwich, competitive, or non-competitive assay methods, to generate a signal that is related to the presence or amount of PSMA in cells, tissues, body fluids, etc. Suitable assay formats also include chromatographic, mass spectrographic, protein "blotting," and cell sorting methods.

In certain embodiments, one or more peptides of the present invention are used as targeting moieties for contrast imaging agents. For example, ultrasound imaging contrast agents that exhibit an affinity for specific tissue types, and especially, disease sites, can be prepared using agents such as liposomes that reflect diagnostic ultrasound and, when conjugated to one or more peptides of the present invention, target themselves to cells and tissues expressing PSMA. The procedure for preparation of ultrasound-reflective liposomes generally involves dispersal (e.g., by sonication) of one or more lipids such as phosphatidylcholine (PC), phosphatidylethanolamine (PE), phosphatidylglycerol (PG), and cholesterol (CH) into a buffer, lyophilization, and reconstitution into a pharmaceutically acceptable excipient. Peptide(s) of the present invention may be directly or indirectly coupled to such lipid components prior to or following dispersal, or may be inserted into the liposome by conjugation to an appropriate hydrophobic moiety. Other "microbubble" ultrasound contrast agents are known in the art and may be conjugated in a similar fashion. Similarly, MRI contrast agents can be prepared using Gd-perfluorocarbon nanoparticles conjugated to one or more peptides of the present invention. Other MRI contrast agents, for example those based on superparamagnetic iron oxide, are known in the art and may be conjugated in a similar fashion.

In another aspect of the inventive subject matter, a method of detecting or quantifying PSMA in a sample will include a step of contacting the sample with contemplated diagnostic reagents under conditions to allow binding of the first PSMA binding moiety to a PSMA in the sample. In another step, binding of the diagnostic reagent to the PSMA is detected using the detectable moiety and/or a labeling agent.

In another aspect of the invention, one or more peptides of the present invention are used as targeting moieties for delivering molecules to cells and tissues which express PSMA. In these embodiments, peptides of the present invention may be directly or indirectly conjugated to a therapeutic agent for delivery to such cells or tissues. Such an approach is analogous to gemtuzumab (MYLOTARG®; Wyeth)), which consists of a humanized mAb targeted to a cell surface marker (CD33) linked to the cytotoxic antibiotic ozogamicin (N-acetyl-γ calicheamicin). Suitable therapeutic agents include radioactive isotopes, antifolates, vinca alkaloids, taxanes, cytokines, nucleic acids such as antisense RNA, ribozymes, short interfering RNA (siRNA), apoptosis-inducing ligands such as TRAIL, and anthracyclines. Such therapeutic agents may be provided encapsulated in particles such as liposomes, which are in turn conjugated to one or more PSMA ligands of the present invention. This list is not meant to be limiting. In these embodiments, peptide linkers that are stable in serum but which can be readily degraded in intracellular compartments (e.g., disulphide linkers) may be superior to noncleavable linkers.

Other alternatives include use of a PSMA binding moiety coupled to an enzyme in a method akin to ADEPT therapy with antibody targeting. In this method, the binding moiety preferentially localizes the enzyme molecule at the target site. The enzyme is designed to rapidly convert a prodrug (inactive drug) to its active (cytotoxic) form. A high dose of prodrug can be administered, where activation would preferentially occur at the target site rather than systemically.

While not limiting to the inventive subject matter, it is contemplated that the sample is a tissue section or a body fluid, that the step of contacting is performed by adding the diagnostic reagent onto the tissue section or by injecting the diagnostic reagent into the body fluid. Thus, the step of detecting may include ultrasound imaging, radiographic imaging, and/or magnetic resonance imaging, and may also include a step of using an anti-PSMA antibody as the labeling agent. In still further contemplated aspects, the solid carrier may be configured as an addressable array, a virus electrode, a surface plasmon resonance chip, or as a colored bead.

Various objects, features, aspects and advantages of the present invention will become more apparent from the following detailed description of preferred embodiments of the invention.

DETAILED DESCRIPTION OF THE INVENTION

Figure 1A:
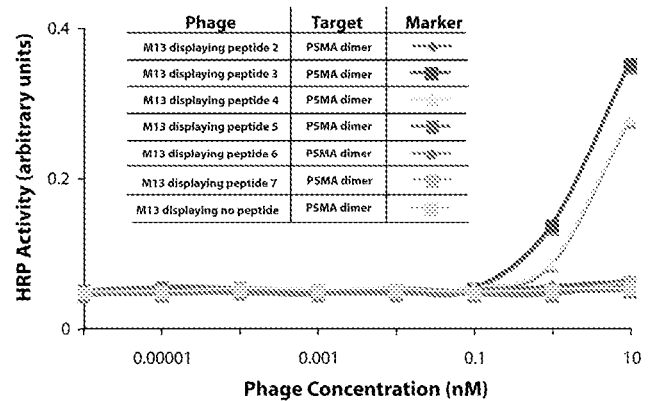
FIGS. 1A-1C are graphs illustrating exemplary binding results for different PSMA ligand motif presenting phages isolated from phage panning.

The inventors have surprisingly discovered that various small peptide molecules can be produced that have high specificity and affinity for PSMA. Such ligands and modifications thereof can advantageously be used in numerous applications. In one especially contemplated application, ligand motifs and/or ligands contemplated herein are employed in diagnostic compositions and methods where the ligand motifs and/or ligands are labeled or otherwise modified to allow production of a specific signal. In another application, the ligand motifs and/or ligands are used in therapeutic compositions and methods where the ligand motifs and/or ligands are modified to interfere with the biological function of PSMA expressed on a cell.

Contemplated Ligand Motifs and Modifications Thereof

It is generally contemplated that PSMA ligand motifs and/or ligands presented herein will have a peptide or peptidomimetic portion that binds to the monomeric form of PSMA and/or the dimeric form of PSMA. This portion will typically have a linear length of between 6 and 20, and more preferably between 7 and 15, and most preferably between 8 and 13 amino acids, and have an apparent affinity to PSMA of equal or less than 10 nM ($K_D$), more preferably equal or less than 1 nM ($K_D$), and most preferably equal or less than 0.1 nM ($K_D$). The term "amino acid" as used herein refers to a molecule containing both amine and carboxyl functional groups, preferably (but not necessarily) bound to the same carbon atom. Thus, especially preferred amino acids are alpha-amino acids (preferably having L-configuration) with the general formula H2N—C(H)(R)—COOH, where R is an organic substituent. For example, suitable amino acids include isoleucine, alanine, leucine, asparagine, lysine, aspartate, methionine, cysteine, phenylalanine, glutamate, threonine, glutamine, tryptophan, glycine, valine, proline, serine, tyrosine, arginine, and histidine.

In especially preferred aspects of the inventive subject matter, contemplated ligand motifs will have the amino acid sequence of $$X_1X_2CVEVX_3QNSCX_4X_5$$ [SEQ ID NO: 2]

wherein $X_1$ is preferably an amino acid with linear side chain, more preferably an amino acid with linear and uncharged side chain, and most preferably serine or leucine, wherein $X_2$ is preferably an amino acid with a charged side chain, more preferably an amino acid with a polar and charged side chain, and most preferably aspartic acid or glutamic acid, wherein $X_3$ is preferably an amino acid with an aromatic moiety in the side chain, more preferably an amino acid with an aromatic moiety in the side chain that is uncharged, and most preferably phenylalanine or tyrosine, wherein $X_4$ is defined as $X_2$, and wherein $X_5$ is preferably an amino acid with non-polar and hydrophobic side chain, and most preferably leucine or tryptophan.

Therefore, particularly contemplated ligand motifs include LDCVEVFQNSCDW [SEQ ID NO: 3], SECVEVFQNSCDW [SEQ ID NO: 4], SDCVEVFQNSCDW [SEQ ID NO: 5], LECVEVYQNSCEW [SEQ ID NO: 6], SECVEVFQNSCEL [SEQ ID NO: 7], and SDCVEVYQNSCDW [SEQ ID NO: 8]. The terms "ligand motif" and "binding moiety" are used interchangeably herein.

While it is generally preferred that the ligand motifs will comprise naturally occurring amino acids, it should be recognized that various modifications are also deemed appropriate and include, inter alia, backbone modifications to so form a peptidomimetic moiety as well as side-chain modifications. Alternatively, or additionally, suitable modifications include use of non-naturally occurring amino acids, D-amino acids, and non-peptide spacers (e.g., alkyl, alkoxy, saccharide, etc.) within the backbone of the peptide or peptidomimetic. Of course, it should be appreciated that the ligands and ligand compositions of the present invention may be chemically synthesized or expressed using recombinant DNA methodology. For example, one or more ligand motifs and/or ligands may be expressed as part of a fusion protein with an additional polypeptide sequence on the N-terminus and/or the C-terminus Suitable additional polypeptide sequences may be naturally occurring sequences (or portions thereof) with immunogenic function, structural function, and/or catalytic function. Thus, a ligand or ligand composition may include one or more ligand motifs.

For example, one or more ligand motifs may be modified by covalent or non-covalent coupling to one or more additional species. These additional species include, but are not limited to, polypeptides, lipids, nucleic acids, cross-linkers, solid phases, contrast agents, toxins, detectable labels, etc. Such coupling may be direct (e.g, one or more ligand motifs may be coupled via a peptide bond to an additional polypeptide sequence) or indirect (e.g., a one or more ligand motifs may be coupled via a linkage chemistry to a solid phase). In the case of non-covalent coupling, one or more ligand motifs may be coupled to one or more additional species by electrostatic and/or hydrophobic interactions. In the case of covalent coupling, a covalent bond may be formed between a ligand motif and one or more additional species at the amino terminus, carboxyl terminus, and/or a side chain of the ligand motif In other examples, one or more ligand motifs may comprise an additional peptide sequence, such as an affinity marker, detection marker, and/or protease cleavage site. Suitable affinity/detection markers include glutathione S-transferase (GST), maltose binding protein (MBP), thioredoxin (Trx), calmodulin binding peptide (CBP), poly-His, FLAG, c-myc, and hemagglutinin (HA). GST, MBP, Trx, CBP, and poly-His enable purification of their cognate fusion proteins on immobilized glutathione, maltose, phenylarsine oxide, calmodulin, and metal-chelate resins, respectively. FLAG, c-myc, and hemagglutinin (HA) enable immunoaffinity purification of fusion proteins using commercially available monoclonal and polyclonal antibodies that specifically recognize these epitope tags. Other suitable tag sequences will be apparent to those of skill in the art. Likewise, numerous proteolytic enzymes (e.g., trypsin, subtilisin, thermolysin, chymotrypsin, papain, etc.) and corresponding protease cleavage sites are known to those of skill in the art. In preferred embodiments, one or more proteolytic enzymes for use in the present methods are selected from the group consisting of factor Xa, enterokinase, thrombin, tobacco etch virus protease, and human rhinovirus 3C protease.

It should still further be appreciated that more than one ligand motifs may be used to so provide a desirable effect. For example, a first ligand motif may be used to preferentially bind to the monomer while a second ligand motif (which may or may not be covalently bound to the first ligand) will preferentially bind to the dimer Consequently, contemplated PSMA ligands may comprise one, two, or even more ligand motifs, which may be separated by an optional spacer that may or may not be a peptide. Thus, the combination of a first and a second ligand motifs (or multiple first motifs) may be in a form in which the ligand motifs are directly covalently coupled to each other, or in which first and second ligand motifs are coupled to each other via a common carrier or other molecule. Thus, the molar ratio of first to second ligand motif can be tailored. In further preferred aspects, the ligand motif will include (in addition to an optionally second ligand motif as described above) the heretofore known PSMA peptide ligand having the amino acid sequence of CALCEFLG [SEQ ID NO: 1]. Therefore, it should be appreciated that a plurality of ligand motifs according to the inventive subject matter may be coupled to one another and/or to one or more additional species to provide a multivalent binding reagent comprising a plurality of PSMA binding ligands. Two or more binding interactions taking place within the same molecular complex may have particularly large effects on the dissociation kinetics ($k_{off}$), as all interactions must be broken simultaneously before dissociation can take place. The gain in apparent affinity through the avidity effect is substantial for a complex with bivalent interaction but may be still increased by increasing the number of interactions.

Further, it should be appreciated that the compounds contemplated herein may comprise in addition to the ligand motif(s) additional moieties that may impart a desirable functionality. For example, it is contemplated that suitable additional moieties may include one or more spacers between two ligand motifs to optimize flexibility and/or solubility and so afford increased affinity and/or bioavailability. In other examples, the spacer between two or more ligand motifs may include a cleavage site specific for PSMA to so generate two or more ligands at the site of catalytic action. In still further examples, additional moieties may be added to the C- and/or N-terminal portion (or intervening portion between two ligand motifs) to allow for detection of the modified compound. Among other suitable moieties, particularly preferred moieties include radiolabels (e.g., fluorine, carbon, technetium or indium radiolabel), affinity moieties (e.g., via biotinylation, etc.), enzymatic moieties (e.g., beta galactosidase), fluorescent or luminescent moieties (e.g., green fluorescent protein), MRI imaging reagents (e.g., gadolinium chelates), and so forth. Similarly, such modifications may also be included into the amino acid portion of the motif (e.g., PET/SPECT detectable label, NMR detectable label, or radioisotope label).

Further contemplated moieties also include solid phases, and it is especially preferred that the solid phase is part of a wall of a fluid container (e.g., wall of a micro well, reaction tube, capillary, microfluidic device, etc.). Alternatively, the solid phase may also be a bead or other insoluble material, preferably with a characterized physical parameter. For example, suitable solid phases will include magnetic beads, colored beads, but also filter membranes or affinity membranes. Additionally, and where desired, contemplated ligands or ligand motifs may be coupled to a solid phase in an addressable format using coupling methodologies well known in the art.

As discussed above, it should be noted that all of the ligand motifs contemplated be may further modified with one or more additional moieties to so impart a desirable function. Moreover, it should be appreciated that all ligand motifs and/or ligands may be present in form of a prodrug, a metabolite, and/or a salt with a pharmaceutically acceptable acid or base. The term "prodrug" as used herein refers to a modification of ligand motifs and/or ligands, wherein the modified compound exhibits less pharmacological activity (as compared to the modified compound) and wherein the modified compound is converted within the body (e.g., in a target cell or target organ) back into the unmodified form through enzymatic or non-enzymatic reactions. For example, conversion of ligand motifs and/or ligands into prodrugs may be useful where the active drug is too toxic for safe systemic administration, or where the contemplated compound is poorly absorbed by the digestive tract or other compartment or cell, or where the body breaks down the ligand motifs and/or ligands before reaching its target.

Thus, it should be recognized that the ligands or ligand motifs according to the inventive subject matter can be modified in numerous manners, and especially preferred modifications include those that improve one or more pharmacokinetic and/or pharmacodynamic parameter. For example, one or more substituents may be added or replaced to achieve a higher AUC in serum. On the other hand, and especially where increased solubility is desired, hydrophilic groups may be added. Exemplary suitable protocols for conversion of contemplated ligands or ligand motifs into the corresponding prodrug form can be found in "Prodrugs (Drugs and the Pharmaceutical Sciences: a Series of Textbooks and Monographs)" by Kenneth B. Sloan (ISBN: 0824786297), and "Hydrolysis in Drug and Prodrug Metabolism: Chemistry, Biochemistry, and Enzymology" by Bernard Testa, Joachim M. Mayer (ISBN: 390639025X), both of which are incorporated by reference herein. Still further, and especially where contemplated ligands or ligand motifs have a higher activity and/or affinity when the compound is metabolized (e.g., hydroxylated, glucuronidated, etc.), it should be appreciated that metabolites of contemplated ligands or ligand motifs are also expressly contemplated herein.

Therefore, it should be appreciated that the ligand motifs presented herein may be modified to form a diagnostic reagent, a therapeutic reagent, and/or a reagent suitable for research and development as it relates to PSMA and modulation of PSMA activity.

Contemplated Compositions

Based on the inventors' discovery of affinity and potential biological activity/effects of contemplated ligand motifs and/or ligands, it is generally contemplated that the ligand motifs and/or ligands according to the inventive subject matter may be formulated for treatment of various diseases associated with PSMA expression, and particularly with malignant prostate cells and tumor vascular imaging. Most preferably, contemplated pharmaceutical compositions comprise a therapeutically effective amount of contemplated ligand motifs and/or ligands (or pharmaceutically acceptable salt, hydrate, or prodrug thereof), and a pharmaceutically acceptable carrier. For example, in one aspect of the inventive subject matter, contemplated compositions are formulated for diagnosis, staging, and/or treatment of prostate cancer and tumor neovasularization.

It is particularly preferred that contemplated ligand motifs and/or ligands are included in a composition that is formulated with one or more non-toxic pharmaceutically acceptable carriers. Suitable pharmaceutical compositions are preferably formulated for oral administration in solid or liquid form, or for parenteral injection. Thus, it should be appreciated that pharmaceutical compositions according to the inventive subject matter may be administered to humans and other animals using various routes, including orally, rectally, parenterally, intraperitoneally, vaginally, or topically.

For example, suitable pharmaceutical compositions for injection preferably comprise pharmaceutically acceptable sterile aqueous or nonaqueous solutions, dispersions, emulsions, or suspensions, as well as sterile powders for reconstitution into sterile injectable solutions or dispersions prior to use. Examples of suitable aqueous and nonaqueous carriers, diluents, solvents, or vehicles include water, ethanol, polyols (e.g., glycerol, propylene glycol, polyethylene glycol, etc.), and suitable mixtures thereof, oils, and injectable organic esters (e.g., ethyl oleate). Contemplated compositions may also contain various inactive ingredients, including preservatives, wetting agents, emulsifying agents, and/or dispersing agents. Sterility may be ensured by inclusion of antibacterial and/or antifungal agents (e.g., paraben, phenol sorbic acid, chlorobutanol, etc.). Where appropriate, osmotically active agents may be included (e.g., sugars, sodium chloride, etc.).

Alternatively, contemplated compositions may be formulated into solid dosage forms for oral administration, and may therefore be capsules, tablets, pills, powders, and granules. In preferred solid dosage forms, contemplated ligand motifs and/or ligands are mixed with at least one of a pharmaceutically acceptable excipient or carrier (e.g., sodium citrate or dicalcium phosphate), a filler or extender (e.g., starch, lactose, sucrose, glucose, mannitol, or silicic acid), a binder (e.g., carboxymethylcellulose, alginates, gelatin, polyvinylpyrrolidone, sucrose, etc.), a humectant (e.g., glycerol), a disintegrating agent (e.g., agar-agar, calcium carbonate, potato or tapioca starch, alginic acid, certain silicates, or sodium carbonate), a solution retarding agent (e.g., paraffin), an absorption accelerator (e.g., quaternary ammonium compound), a wetting agents (e.g., cetyl alcohol and glycerol monostearate), and absorbents (e.g., kaolin, or bentonite clay), and a lubricant (e.g., talc, calcium stearate, magnesium stearate, solid polyethylene glycols, sodium lauryl sulfate).

Solid compositions of a similar type may also be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the pharmaceutical formulating art. Contemplated compositions may further be formulated to release the active ingredient(s) only, or preferentially, in a certain part of the intestinal tract, optionally, in a delayed manner. Examples of embedding compositions which can be used include polymeric substances and waxes. Contemplated ligand motifs and/or ligands may also be in micro-encapsulated form, if appropriate, with one or more of the above-mentioned excipients.

Liquid dosage forms for oral administration include pharmaceutically acceptable emulsions, solutions, suspensions, syrups and elixirs. In addition to the ligand motifs and/or ligands, liquid dosage forms may contain inert diluents commonly used in the art (e.g., water, or other solvent, solubilizing agents), emulsifiers (e.g., ethyl alcohol, isopropyl alcohol, ethyl carbonate, ethyl acetate, benzyl alcohol, benzyl benzoate, propylene glycol, 1,3-butylene glycol, dimethyl formamide), oils (and in particular, cottonseed, groundnut, corn, germ, olive, castor, and sesame oils), glycerol, tetrahydrofurfuryl alcohol, polyethylene glycols and fatty acid esters of sorbitan, and mixtures thereof. Besides inert diluents, the oral compositions may also include adjuvants such as wetting agents, emulsifying and suspending agents, sweetening, flavoring, and perfuming agents.

Compositions for rectal or vaginal administration are preferably suppositories which can be prepared by mixing the compounds of this invention with suitable non-irritating excipients or carriers such as cocoa butter, polyethylene glycol or a suppository wax which are solid at room temperature but liquid at body temperature and therefore melt in the rectum or vaginal cavity and release the active compound.

Ligand motifs and/or ligands according to the inventive subject matter can also be administered in form of liposomes, which may be unilamellar, oligolamellar, or polylamellar. Contemplated compositions in liposome form may further contain stabilizers, preservatives, excipients, etc. Preferred lipids for liposome formation include phospholipids and the phosphatidyl cholines (lecithins), both natural and synthetic. Methods to form liposomes are known in the art (e.g., Prescott, Ed., Methods in Cell Biology, Volume XIV, Academic Press, New York, N.Y. (1976), p. 33 et seq.)

Actual dosage levels of contemplated ligand motifs and/or ligands in pharmaceutical and/or diagnostic compositions according to the inventive subject matter may be varied so as to obtain an amount of contemplated ligand motifs and/or ligands that is effective to achieve the desired diagnostic or therapeutic response for a particular patient, composition, and mode of administration. Thus, the selected dosage level will depend upon various factors, including the avidity and activity of the particular ligand motifs and/or ligands, the route of administration, the severity of the condition being treated, and the condition and prior medical history of the patient being treated. However, it is within the skill of the art to start doses of the ligand motifs and/or ligands at levels lower than required to achieve the desired therapeutic effect and to gradually increase the dosage until the desired effect is achieved. Generally, dosage levels of about 0.01 mg to about 500 mg, more preferably of about 0.5 mg to about 50 mg of contemplated ligand motifs and/or ligands per kilogram of body weight per day are administered orally to a mammalian patient. If desired, the effective daily dose may be divided into multiple doses for purposes of administration, e.g., two to four separate doses per day.

It should still further be appreciated that contemplated pharmaceutical compositions may also include additional pharmaceutically active compounds, and contemplated additional active compounds include anti-neoplastic and anti-angiogenic agents as further discussed below.

Targeted Drug Delivery Compositions

In further preferred aspects of the inventive subject matter, one or more ligand motifs are used as targeting moieties for delivering molecules to cells and tissues which express PSMA. In these embodiments, one or more ligand motifs may be directly or indirectly conjugated to a therapeutic agent for delivery to such cells or tissues. Such an approach is analogous to gemtuzumab (MYLOTARG®; Wyeth)), which consists of a humanized mAb targeted to a cell surface marker (CD33) linked to the cytotoxic antibiotic ozogamicin (N-acetyl-γ calicheamicin). Suitable therapeutic agents include radioactive isotopes, antifolates, vinca alkaloids, taxanes, cytokines, nucleic acids such as antisense RNA, ribozymes, short interfering RNA (siRNA), apoptosis-inducing ligands such as TRAIL, and anthracyclines. Such therapeutic agents may be provided encapsulated in particles such as liposomes, which are in turn conjugated to one or more PSMA ligands of the present invention. In these embodiments, peptide linkers that are stable in serum but which can be readily degraded in intracellular compartments (e.g., disulfide linkers) may be superior to non-cleavable linkers.

In alternative aspects, one or more ligand motifs are used as targeting moieties for directed enzyme prodrug therapy approach (analogous to ADEPT), which specifically aims at causing bystander effects by targeting enzymes to a targeted cell and delivering a prodrug that is locally converted to a chemotherapeutic by the targeted enzyme.

Targeted Contrast Media

As used herein, "contrast agent", "contrast medium" and "imaging agent" relate to any composition administered in vivo to obtain images of an area of interest of a body. The images may be obtained using any imaging technique known in the art. Preferably, use of such agent provides an enhanced image of the body structures within the area of interest as compared to an image obtained without use of any such agent.

In preferred aspects, one or more ligand motifs are used as targeting moieties for contrast imaging agents. For example, ultrasound imaging contrast agents that exhibit an affinity for specific tissue types, and especially, disease sites, can be prepared using agents such as liposomes that reflect diagnostic ultrasound and, when conjugated to one or more ligand motifs and/or ligands, target themselves to cells and tissues expressing PSMA. The procedure for preparation of ultrasound-reflective liposomes generally involves dispersal (e.g., by sonication) of one or more lipids such as phosphatidylcholine (PC), phosphatidylethanolamine (PE), phosphatidylglycerol (PG), and cholesterol (CH) into a buffer, lyophilization, and reconstitution into a pharmaceutically acceptable excipient. Contemplated ligands may be directly or indirectly coupled to such lipid components prior to or following dispersal, or may be inserted into the liposome by conjugation to an appropriate hydrophobic moiety. Other "microbubble" ultrasound contrast agents are known in the art and may be conjugated in a similar fashion. Similarly, MRI contrast agents can be prepared using Gd-perfluorocarbon nanoparticles conjugated to one or more ligand motifs and/or ligands. Other MRI contrast agents, for example those based on superparamagnetic iron oxide, are known in the art and may be conjugated in a similar fashion.

In further contemplated aspects, methods for delivering such targeted contrast agents comprise administering a pharmaceutical formulation comprising one or more such contrast agents to a subject in need thereof Formulations may be administered by various enteral and parenteral routes, including intravenous, oral, intraperitoneal, subcutaneous, rectal and intrauterine routes of delivery. Such methods may further comprise imaging the subject using an imaging method appropriate to the contrast agent to determine any site(s) of accumulated contrast agent in the subject.

Ultrasound ("US") is an imaging process that relies on the reflection of sound waves within the body to produce an image thereof High frequency sound (ultrasonic) waves, which are above the range of sound audible to humans, are directed at the region of interest within the body. The waves are reflected back wherever there is a change in the physical parameters of the structures within the body, e.g., a change in density between two adjacent organs. The ultrasound equipment receives the reflected sound waves and transmits them into an image based on the differing levels of intensity of the reflected waves.

Use of a contrast agent enhances the differences in intensities of the reflected waves. For example, intravenous encapsulated microbubble contrast agents have become an established clinical tool for enhancing medical diagnostic ultrasound and Doppler sensitivity. Some current contrast agents function to enhance the appearance of the blood pool and to define its architecture and integrity. Other contrast agents provide targeted, organ-specific imaging based upon the biodistribution and pharmacokinetics of the circulating contrast agent. Albunex (from Molecular Biosystems, San Diego, Calif.), the first commercially available ultrasound contrast agent, is a suspension of air-filled albumin microspheres produced by sonication of a heated solution of 5% human albumin.

The microbubble response relative to a driving acoustic pressure can be divided into three categories: (1) linear scattering, (2) nonlinear scattering, and (3) cavitation/destruction. Microbubbles produce linear scattering with low acoustic driving pressures and produce non linear scattering with moderate acoustic driving pressures. At moderate acoustic driving pressures, microbubbles exhibit pressure peaks at the compressional phases of the source thereby providing both harmonic and subharmonic energy greater than the surrounding medium. At very high acoustic driving pressures microbubbles cavitate or destruct as a result of fragmentation and deflation and thus create an associated acoustic emission signal. The absolute values for low, moderate and high acoustic driving pressures are not well defined and depend upon not only the acoustic parameters of the ultrasonic source but also the constituent physical properties of the microbubbles themselves, as well as the fluid surrounding them.

Efforts to address the need for an increase in the plasma half-life of medical ultrasonic contrast agents have focused on: (1) strengthening the structure of the encapsulating shell, (2) employing different substances for the encapsulating shell, or (3) chemical modification of the microsphere surface, for example, by pegylation. For example, the use of galactose with human serum albumin microspheres appears to strengthen the shell, thereby increasing the half-life to 3 to 6 minutes. (Goldberg, "Ultrasound Contrast Agents," Clin. Diag 30 Ultrasound, 28:35-45 (1993)). Kimura et al. utilized small unilamellar vesicle ("SW"), large unilamellar vesicle ("LW") and multilamellar vesicle ("MLV") as echogenic liposomes. (Kimura et al., "Preparation and Characterization of Echogenic Liposome as an Ultrasound Contrast Agent," Chem. Pharm. Bull., 46(10) 1493-96 (1998)). The acoustic reflectivity obtained with the echogenic MLV was larger than that of the gas bubbles enclosed within a surfactant mixture. A half-lifetime of 39 minutes was observed for the MLV prepared from egg yolk phosphatidylcholine liposomes. The duration of reflectivity was prolonged drastically to a half-lifetime of 866 minutes by incorporating cholesterol into the MLV, although, significantly, the echogenicity was decreased by such incorporation. Although there have been a number of important steps at lengthening the effective imaging half-life of injectable ultrasonic contrast agents using liposomes, there has been an overall reduction in the echogenicity of these agents.

Another imaging technique is magnetic resonance ("MR") imaging. This modality relies on detecting the emission of electromagnetic radiation by certain atomic nuclei in the body upon application of pulsed radio frequency signals in the presence of a magnetic field. The resulting magnetic echoes produced when the signal is terminated ultimately are translated into an image.

Use of certain contrast agents with MR is known in the art. Contrast agents are commonly used intravenously to change the local magnetic field in tissue. Generally, abnormal tissue will respond differently in the presence of the contrast agent as compared to normal tissue and will give off a different magnetic echo. Thus, when the magnetic echoes are translated into an image, an image of the tissue abnormalities is provided.

The use of gadolinium oxide ($Gd_2O_3$) particles measuring less than 2 μm in diameter as a prototype MR contrast agent has been examined for imaging the liver and spleen. (Burnett et al., "Gadolinium Oxide: A Prototype Agent for Contrast Enhanced Imaging of the Liver and Spleen with Magnetic Resonance," Magnetic Resonance Imaging, 3:65-71 (1985)). Magnetite ($Fe_3O_4$) albumin microspheres ("MAM") have also been used as a superparamagnetic contrast agent for reticuloendothelial MR imaging. (Widder et al., "Magnetite Albumin Suspension: A Superparamagnetic Oral MR Contrast Agent," ARE, 149: 839-43 (1987)). MAM was synthesized by combining 5% human serum albumin ("HSA") and magnetite to create albumin microspheres using a modified water-in-oil emulsion polymerization technique. Nonlinear behavior of MAM with increased applied external magnetic field over 0.3-0.9 T was observed. The influence of magnetite on T2 relaxation is believed to be due to local field inhomogeneities generated by the large magnetic moment of $Fe_3O_4$, which causes dephasing of proton spins and an acceleration of T2 relaxation with negligible To effects. Because iron oxide is predominately a T2 relaxation agent, MAM has limited usefulness in conventional MR imaging. Additionally, based on the lower density of iron oxide relative to other heavy metals, iron oxide, and thus MAM, has a very limited utility for other imaging modalities, such as computed tomography.

Computed tomography ("CT"), also called computerized axial tomography, is an imaging modality that utilizes a toroidal, or donut-shaped x-ray camera to provide a cross sectional image of the body area of interest. Use of certain contrast agents to improve CT images is known. Generally, the contrast agent localizes in a particular body compartment and differentially opacities normal or abnormal tissue. The contrast agent causes the tissue to inhibit passage of x-rays to produce a shadow of positive contrast in the resulting image. Iodine-based contrast agents are considered to be the industry standard with CT.

Gd-DTPA contrast agents have been used for certain limited applications in conventional angiography and CT imaging. (Bloem and Wondergem, "Gd-DTPA as a Contrast Agent in CT," Radiology, 171:578-79 (1989)). Perfluorocarbon emulsions have also been evaluated for contrast image enhancement. Perflubron (perfluorooctyl bromide, "PFOB") emulsified with egg yolk lecithin has been tested for use in US (due to its high density), MR (fluorine nuclei imaging or as a signal void for hydrogen nuclei imaging) and CT imaging (due to its bromine atom). However, neither fluorine MR imaging nor signal void imaging have found widespread use in hospital or clinical practice, where To (and to a lesser extent, T2) imaging of protons is typical. Also, PFOB is less dense radiographically, i.e. less radio opaque than iodine-based CT contrast agents, making larger doses necessary in order to achieve adequate x-ray attenuation.

One obstacle limiting clinical application of contrast agents is that non-targeted agents may be unable to reach sufficient concentrations in a site of interest (e.g., the site of a tumor) to either produce a strong signal for imaging or to carry optimal amounts of therapeutic agents into the diseased tissues. One approach to overcome this problem is to develop tumor-targeted agents that are highly sensitive imaging probes and/or are capable of conjugating large amounts of therapeutic agents. Antibody-based targeted contrast media have been found to maintain both the properties of the antibody and the contrast particles. Among these studies, conjugation of the magnetism-engineered iron oxide (MEIO) nanoparticles with Herceptin, a well-known antibody against the HER2/neu receptor which is overexpressed in breast cancer cells, showed in vivo cancer targeting and imaging of HER2/neu with high sensitivity which enables the MR detection of tumors as small as 50 mg.

The large size of an intact antibody limits the ability of the contrast agent to permeate through the vasculature into areas with tumor cells. In addition, the interaction of antibody with Fc receptors on normal tissues can alter the specificity of targeted contrast agents. To solve those problems, ligand motifs and/or ligands such as those of the present invention can be used as target moieties for engineering targeted contrast agent.

Analyte Assays

It is generally contemplated that one or more ligand motifs may be used as targeting moieties for binding detectable labels to PSMA. Suitable detectable labels may include molecules that are themselves detectable (e.g., fluorescent moieties, electrochemical labels, metal chelates, etc.) as well as molecules that may be indirectly detected by production of a detectable reaction product (e.g., enzymes such as horseradish peroxidase, alkaline phosphatase, etc.) or by a specific binding molecule which itself may be detectable (e.g., biotin, digoxigenin, maltose, oligohistidine, 2,4-dintrobenzene, phenylarsenate, ssDNA, dsDNA, etc.). As discussed above, coupling of the one or more ligand motifs and/or ligands to the detectable label may be direct or indirect. Detection may be in situ, in vivo, in vitro on a tissue section or in solution, etc.

Assay devices and methods known in the art can utilize specific binding agents such as the ligand motifs and/or ligands in various sandwich, competitive, or non-competitive assay formats, to generate a signal that is related to the presence or amount of a biomarker of interest, in this case PSMA. Suitable assay formats also include chromatographic, mass spectrographic, and protein "blotting" methods. Additionally, certain methods and devices, such as biosensors and optical assays, may be employed to determine the presence or amount of analytes without the need for a labeled molecule. See, e.g., U.S. Pat. Nos. 5,631,171; and 5,955,377, each of which is hereby incorporated by reference in its entirety, including all tables, figures and claims. One skilled in the art also recognizes that robotic instrumentation including but not limited to Beckman ACCESS®, Abbott AXSYM®, Roche ELECSYS®, Dade Behring STRATUS® systems are among the immunoassay analyzers that are capable of performing immunoassays. But any suitable immunoassay-type format may be utilized, for example, enzyme-linked immunoassays (ELISA), radioimmunoassays (RIAs), competitive binding assays, and the like.

Contemplated ligand motifs and/or ligands may be immobilized onto a variety of solid supports for use in assays. Solid phases that may be used to immobilize specific binding members include those developed and/or used as solid phases in solid phase binding assays. Examples of suitable solid phases include membrane filters, cellulose-based papers, beads (including polymeric, latex and paramagnetic particles), glass, silicon wafers, microparticles, nanoparticles, TentaGels, AgroGels, PEGA gels, SPOCC gels, and multiple-well plates. An assay strip could be prepared by coating the ligand motifs and/or ligands in an array on solid support. This strip could then be dipped into the test sample and then processed quickly through washes and detection steps to generate a measurable signal, such as a colored spot. The ligand motifs and/or ligands may also be bound to specific zones of assay devices either by conjugating directly to an assay device surface, or by indirect binding. In an example of the later case, ligand motifs and/or ligands may be immobilized on particles or other solid supports, and that solid support immobilized to the device surface. Consequently, targeted detectable labeled molecules may be used in various sandwich, competitive, or non-competitive assay methods, to generate a signal that is related to the presence or amount of PSMA in cells, tissues, body fluids, etc. Suitable assay formats also include chromatographic, mass spectrographic, protein "blotting", and cell sorting methods.

Biological assays require methods for detection, and one of the most common methods for quantitation of results is to conjugate a detectable label to a protein or nucleic acid that has affinity for one of the components in the biological system being studied. Detectable labels may include molecules that are themselves detectable (e.g., fluorescent moieties, electrochemical labels, metal chelates, etc.) as well as molecules that may be indirectly detected by production of a detectable reaction product (e.g., enzymes such as horseradish peroxidase, alkaline phosphatase, etc.) or by a specific binding molecule which itself may be detectable (e.g., biotin, digoxigenin, maltose, oligohistidine, 2,4-dintrobenzene, phenylarsenate, ssDNA, dsDNA, etc.).

Detectably labeled PSMA ligand motifs and/or ligands may also find use in flow cytometry. Flow cytometry and the related fluorescence-activated cell sorting provide a method for detecting and sorting a target cell from a heterogeneous mixture of biological cells based upon the specific light scattering and fluorescent characteristics of each cell. It provides fast, objective and quantitative recording of fluorescent signals from individual cells, and can also provide physical separation of cells of particular interest. In general, a beam of light (usually laser light) is directed onto a hydro-dynamically focused stream of fluid. Detectors are aimed at the point where the stream passes through the light beam; one in line with the light beam (Forward Scatter or FSC) and several perpendicular to it (Side Scatter (SSC), as well as one or more fluorescent detectors. Each suspended particle from 0.2 to 150 micrometers passing through the beam scatters the light in some way, and fluorescent chemicals found in the particle or attached to the particle (e.g., by means of a specific ligand) may be excited, and a combination of scattered and fluorescent light may be picked up by the detectors. By analyzing the detected characteristics at each detector (one for each fluorescent emission peak) it is possible to derive various types of information about the physical and chemical structure of each individual particle.

Methods for Coupling of Ligand Motifs

Coupling of the ligand motifs and/or ligands (e.g., to contrast agents, labels, solid phases, toxins, etc.) can be achieved by non-covalent interactions, for example, electrostatic interactions, hydrophobic interactions, Van der Waals interactions, and hydrogen bond interactions. In the alternative, coupling may be by means of covalent bonds. Chemical cross-linkers also useful for preparing such peptide conjugates. Cross-linking agents often employ functional groups that couple to amino acid side chains of peptides. These reagents may be classified on the basis of the following: (1) functional groups and chemical specificity; (2) length and composition of the cross-bridge; (3) whether the cross-linking groups are similar (homobifunctional) or different (heterobifunctional); (4) whether the groups react chemically or photochemically; (5) whether the reagent is cleavable; and (6) whether the reagent can be radiolabeled or tagged with another label.

Reactive groups that can be targeted using a cross-linker include primary amines, sulfhydryls, carbonyls, carbohydrates and carboxylic acids. In addition, many reactive groups can be coupled nonselectively using a cross-linker such as photoreactive phenyl azides.

Cross-linking reagents contain at least two reactive groups, and are divided generally into homofunctional cross-linkers (containing identical reactive groups) and heterofunctional cross-linkers (containing non-identical reactive groups). While for convenience the following discussion refers to homobifunctional and heterobifunctional cross-linkers (where "bifunctional" refers to the presence of two functional groups), cross-linking reagents having more than two functional groups are well known to the artisan and are within the scope of the invention described herein.

Homobifunctional cross-linkers that couple through amines, sulfhydryls or react non-specifically are available from many commercial sources. Maleimides, alkyl and aryl halides, alpha-haloacyls and pyridyl disulfides are thiol reactive groups. Maleimides, alkyl and aryl halides, and alpha-haloacyls react with sulfhydryls to form thiol ether bonds, while pyridyl disulfides react with sulfhydryls to produce mixed disulfides. The pyridyl disulfide product is cleavable. Imidoesters are also very useful for protein-protein cross-links. These cross-linkers can penetrate cell membranes and cross-link proteins within the membrane to study membrane composition, structure and protein-protein and protein-lipid interactions. Imidoesters are also useful for oligomer formation. For example, cross-linking proteins to form oligomers may reveal if a bivalent, dimeric or trimeric form of the protein is responsible for activity.

A nonselective homobifunctional cross-linker is useful for conjugating functional groups, such as hydroxyls for which specific cross-linkers are not available. An example of a non-selective homobifunctional cross-linker is BASED (Product #21564 Pierce Co.). This cross-linker has a long spacer arm and 2 aromatic rings which makes it very hydrophobic with a limited solubility in aqueous systems. This cross-linker also has a large diffusion capacity and may be useful for permeation of biological membranes before conjugation initiates.

Heterobifunctional cross-linkers possess two or more different reactive groups that allow for sequential conjugations with specific groups of proteins, minimizing undesirable polymerization or self-conjugation. Heterobifunctional reagents are also used when modification of amines is problematic. Amines may sometimes be found at the active sites of macromolecules, and the modification of these may lead to the loss of activity. Other moieties such as sulfhydryls, carboxyls, phenols and carbohydrates may be more appropriate targets. A two-step strategy allows for the coupling of a protein that can tolerate the modification of its amines to a protein with other accessible groups. A variety of heterobifunctional cross-linkers, each combining different attributes for successful conjugation are commercially available. Cross-linkers that are amine-reactive at one end and sulfhydryl-reactive at the other end are quite common.

If using heterobifunctional reagents, the most labile group is typically reacted first to ensure effective cross-linking and avoid unwanted polymerization. A selection of heterobifunctional reagents that contain at least one photoaffinity group are also commercially available. This selection includes iodinatable and cleavable reagents that react nonspecifically at the azido group and with amines, sulfhydryls, carbohydrates and carbonyls.

Many factors must be considered to determine optimum cross-linker-to-target molar ratios. Depending on the application, the degree of conjugation is an important factor. For example, when preparing immunogen conjugates, a high degree of conjugation is normally desired to increase the immunogenicity of the antigen. However, when conjugating to an antibody or an enzyme, a low-to-moderate degree of conjugation may be optimal to ensure that the biological activity of the protein is retained. It is also important to consider the number of reactive groups on the surface of the protein. If there are numerous target groups, a lower cross-linker-to-protein ratio can be used. For a limited number of potential targets, a higher cross-linker-to-protein ratio may be required. This translates into more cross-linker per gram for a small molecular weight protein.

Conformational changes of proteins associated with a particular interaction may also be analyzed by performing cross-linking studies before and after the interaction. A comparison is made by using different arm-length cross-linkers and analyzing the success of conjugation. The use of cross-linkers with different reactive groups and/or spacer arms may be desirable when the conformation of the protein changes such that hindered amino acids become available for cross-linking.

Cross-linkers are available with varying lengths of spacer arms or bridges connecting the reactive ends. The most apparent attribute of the bridge is its ability to deal with steric considerations of the moieties to be linked. Because steric effects dictate the distance between potential reaction sites for cross-linking, different lengths of bridges may be considered for the interaction. Shorter spacer arms are often used in intramolecular cross-linking studies, while intermolecular cross-linking is favored with a cross-linker containing a longer spacer arm.

Contemplated Devices

In still further aspects of the inventive subject matter numerous devices are contemplated where one or more of the ligand motifs is used on a solid carrier as a sensor or affinity marker to so allow measurement (qualitative or quantitative) of PSMA. For example, suitable devices will include those in which one or more of the ligand motifs is immobilized on a surface to so form an electrode as described in WO2007/104058, which is incorporated by reference herein. Using such devices, the presence of PSMA (isolated or on a cell) can be determined, as well as kinetic or SAR studies can be undertaken that help identify binding requirements of a ligand to PSMA or that help determine the interaction of a non-ligand motif compound with PSMA (e.g., using a competitive assay). Further suitable devices will especially include those in which one or more of contemplated ligand motifs are immobilized on a solid carrier in an addressable fashion (e.g., in an addressable x-y grid, or in association with a colored bead).

EXAMPLES

The following is provided as exemplary guidance to a practitioner and to illustrate some of the aspects of the inventive subject matter. It should be appreciated, however, that numerous modifications can be implemented without departing from the inventive concept presented herein.

Modes of Binding for Selected PSMA-binding Peptides

Figure 5:
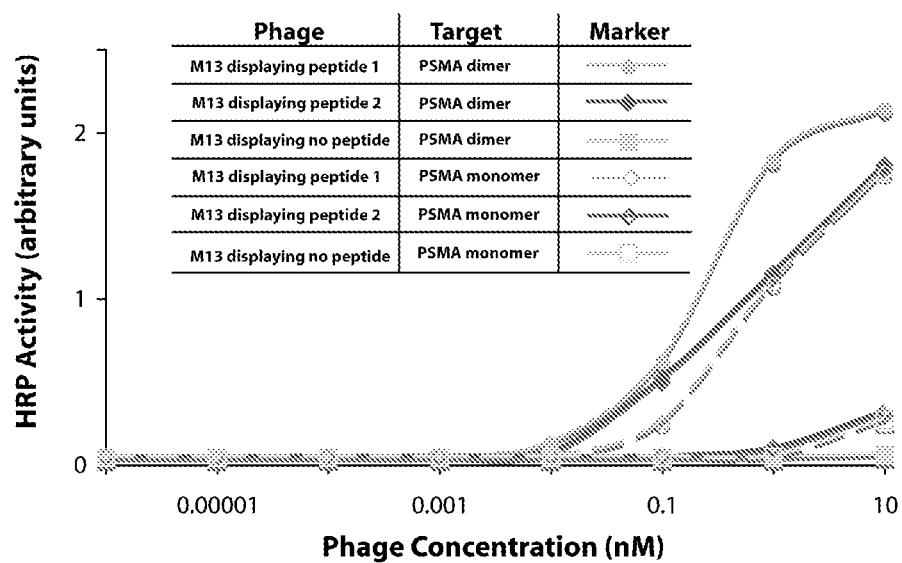
FIG. 5 is a graph illustrating the differential binding modes of phage-displayed PSMA ligand motifs.

PSMA-binding peptides were selected from phage-displayed peptide libraries with both linear and disulfide-constrained peptide binding motifs. An eight residue long peptide with the amino acid sequence CALCEFLG [SEQ ID NO: 1], was previously identified as a PSMA binder from an 8-mer (X8) library. Phage-displayed ELISAs, quartz crystal microbalance (QCM) studies, and electrochemical impedance spectroscopy (EIS) measurements demonstrated strong binding by CALCEFLG [SEQ ID NO: 1] (also referred to as peptide 1 in the Figures) to PSMA as reported previously. In addition to CALCEFLG [SEQ ID NO: 1], the inventors also examined a longer 13-mer peptide, selected from a disulfide-constrained library with the amino acid sequence LDCVEVFQNSCDW [SEQ ID NO: 3] (also referred to as peptide 2 in the Figures). Phage-displayed ELISAs demonstrate the varying strengths of [SEQ ID NO: 1] and [SEQ ID NO: 3], in binding to the monomeric and dimeric isoforms of PSMA as can be taken from FIG. 5. Here, the graph illustrates phage-displayed peptides binding to 1 μg/mL PSMA dimer and monomer in an ELISA. Peptide 1 [SEQ ID NO: 1] binds with a higher affinity to PSMA dimer than peptide 2 [SEQ ID NO: 3]. Peptide 2 [SEQ ID NO: 3] does not bind PSMA monomer with appreciable affinity.

With efficient binding to both the monomeric and homodimeric PSMA, peptide 1 [SEQ ID NO: 1] is thought to recognize a site on the individual monomer subunit that remains accessible even when the protein dimerizes. However, the apparent affinity of peptide 1 [SEQ ID NO: 1] for dimeric PSMA exceeds affinity for the monomeric isoform. As suggested by this higher apparent affinity for dimeric PSMA, the dimer provides twice the binding sites for peptide 1 [SEQ ID NO: 1] to bind. However, the longer peptide 2 [SEQ ID NO: 3], only binds to dimeric PSMA, and fails to bind the monomer with significant affinity. Based on the two distinct binding modes of the two peptides, the inventors contemplate that two ligand motifs could work in concert, resulting in higher sensitivity and a lower limit of PSMA detection.

Affinity Maturation of D6 Homolog Library

Affinity maturation can increase the binding strength of a peptide for a target molecule. One effective affinity maturation method applies homologous amino acid substitutions in every position of the peptide sequence, termed homolog shotgun scanning The technique probes the effects of closely homologous side chain substitutions (e.g., Tyr mutated to a 1:1 mixture of Tyr and Phe) in every position, and allows for selection of peptides with improved binding to its target. To improve the modest binding by peptide 2 [SEQ ID NO: 3] to the PSMA dimer, the peptide sequence was used as a template for a homolog shotgun scanning library synthesized by site-directed mutagenesis.

Homolog shotgun scanning of peptide 2 [SEQ ID NO: 3] applied combinatorial libraries of wild-type and homologous side chains in every amino acid position. The two Cys residues could provide conformational rigidity to the peptide, and were unchanged in the library. The experimental diversity of the homolog library of $\approx 2 \times 10^9$ vastly exceeded the theoretical diversity for the library ($1.84 \times 10^4$). Thus, all possible combinations of wild-type and homologous substitutions were likely represented in the library. Five PSMA-binding peptide sequences emerged after three rounds of library selections. [SEQ ID NOs: 4-8]

Figure 1B:
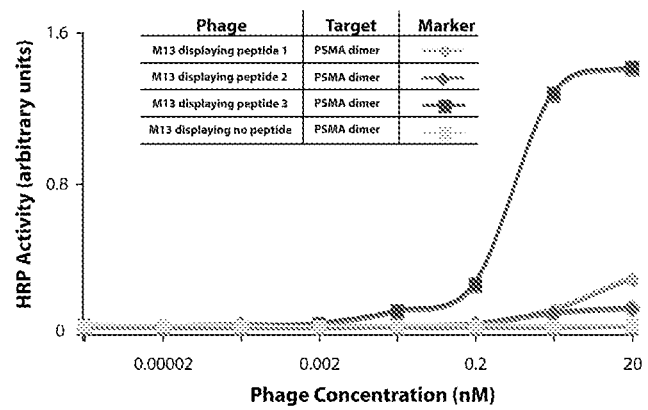
Figure 1C:
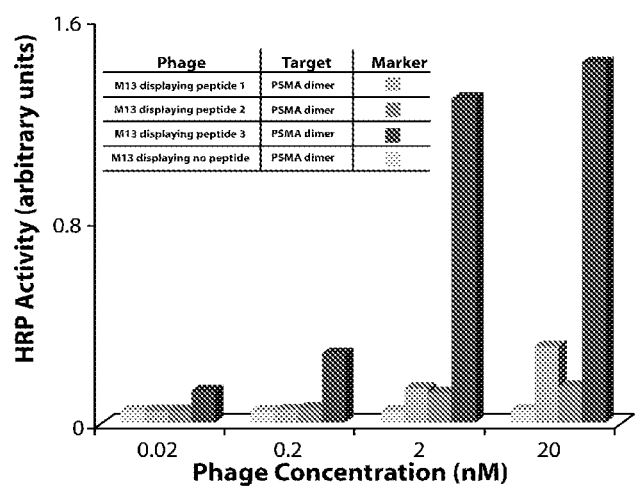

Affinities of Peptide Ligands Selected from the Homolog Shotgun Scanning Library The five peptides [SEQ ID NOs: 4-8] (identified in the Figures as peptides 3-7, respectively) from the homolog shotgun scanning library were next assessed for their relative binding affinities to PSMA, and demonstrated equivalent or better binding than the parent, peptide 2 [SEQ ID NO: 3], which is illustrated in FIG. 1A. These peptides were assayed for binding to 1 μg/mL of homodimeric PSMA, a concentration 10-fold less than the parent peptide required for binding assays. This higher stringency can better distinguish very high from moderate affinity binders. With an increased binding signal resulting from a lower concentration and half of the binding time, the phage-based ELISA demonstrates that peptides 3 and 4 [SEQ ID NOs: 4 and 5] possess a higher affinity towards the target. The negative control phage, which lack a displayed peptide, show no significant binding to PSMA, as expected. A phage-based ELISA with 20 nM phage demonstrates that peptide 3 [SEQ ID NO: 4] possesses ≈1000 times higher affinity for PSMA compared to the parent peptide 2 [SEQ ID NO: 3], and ≈100 times higher affinity than that of peptide 1 [SEQ ID NO: 2] based upon comparison of phage concentration versus HRP activity of different peptide-displaying phage as can be taken from FIGS. 1B and 1C. Here, results for phage-based ELISAs are shown comparing binding affinities of peptides to PSMA (1 μg/mL). FIG. 1A illustrated peptides selected from homolog shotgun scanning library. FIG. 1B illustrates relative affinity of selected peptide 3 [SEQ ID NO: 4] versus the previous highest affinity peptide 1 [SEQ ID NO: 2]. FIG. 1C illustrates a bar graph showing that 20 nM phage displaying peptide 1 [SEQ ID NO: 2] has binding affinity similar to that of 0.2 nM phage displaying peptide 3 [SEQ ID NO: 4], and 20 nM phage displaying parent peptide 2 [SEQ ID NO: 3] has binding affinity similar to 0.02 nM phage displaying peptide 3 [SEQ ID NO: 4].

As expected by the binding preference of the parent peptide 2 [SEQ ID NO: 3] for PSMA, peptide 3 [SEQ ID NO: 4] demonstrates no detectable cross-reactivity for binding transferrin receptor (TfR), a homolog of PSMA (54% sequence identical). It should be noted that the two substitutions incorporated in the sequence of peptide 3 [SEQ ID NO: 4] were L1S and D2E. The serine substitution removes a hydrophobic leucine residue, which provides the peptide with a more polar side chain, which can accept and donate hydrogen bonds (H-bonds). The hydroxyl group likely improves the surface complementarity at the binding interface with PSMA by creating new H-bonding contacts with the protein backbone, or by participating in an extended H-bonding network directly or indirectly through water to other side chains at the binding site. The selection of Glu in place of Asp merely extends the side chain length by one carbon unit. This substitution maintains contribution of the carboxylate functionality, and the length extension of 1.5 Å could allow for new H-bonding or salt-bridging opportunities. Clearly, the core sequence of the selected peptides is critical for the molecular recognition of PSMA, and this core remained conserved in the tightest binding peptides.

Figure 2:
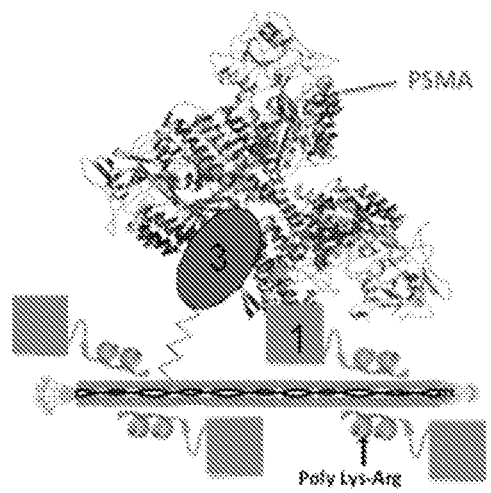
FIG. 2 is a schematic illustration of PSMA binding by two distinct ligand motifs.

In an attempt to produce a PSMA binding entity that had improved binding affinity, a second PSMA ligand motif was coupled to a first ligand motif. Specifically, one of the ligand motifs was presented via phage display while the other was attached to the surface of the phage. Of course, it should be appreciated that numerous alternative manners of coupling are also deemed suitable. In order to introduce the second receptor, the negatively charged phage coat of M13 was used to link artificial receptors for multivalent target binding. Three solvent-exposed, negatively charged residues confer an overall net negative charge to the phage coat. A recent study has shown that the extended negative charge of the M13 phage coat leads to very strong adherence to poly-L-lysine and short, chemically synthesized oligolysine peptides. These studies identified a 200:1 molar ratio of oligolysine to phage as optimal for coating the charged phage surface. Here, a short poly-cationic oligomer was covalently linked to a PSMA-binding peptide 1 [SEQ ID NO.2] to assist in stronger selectivity and affinity for PSMA, a lower apparent $K_D$, and an improved limit of detection for methods using such dual ligands. Conventional phage display genetically links PSMA-binding peptide 3 [SEQ ID NO.4] on the P8 coat protein, and a schematic illustration of the dual ligand assembly is depicted in FIG. 2.

In order to construct an artificially displayed receptor two approaches were taken. A genetically synthesized fusion peptide was constructed from a 14-mer oligopeptide that was made from lysine and arginine residues (total of 8 lysine and 6 arginine, KR14), which was linked to the PSMA-binding peptide 1 [SEQ ID NO.2] and termed 1-KR14. The variation of lysine and arginine residues facilitated amplification of the gene sequence by PCR, assisted in subcloning, and helped avoid potential translational problems during ribosomal protein synthesis. In another route, an oligolysine (K14) peptide and the PSMA-binding peptide 1 [SEQ ID NO.2] were chemically synthesized in parallel via solid phase synthesis. Then, an azide or alkyne functionality was attached to the N-terminus of each peptide and the two peptides were coupled via a [3+2] cycloaddition reaction, yielding the fused 1-K14 peptide. The 1-K14 peptide wraps the surface of the phage for artificial display of peptide 1 [SEQ ID NO.2].

Receptor-wrapping Results and Effects on Binding

The 1-KR14 peptide was expressed as a C-terminal fusion to maltose-binding protein (MBP). Initial expression studies without the MBP tag failed to produce the polycationic peptide 1-KR14, possibly due to degradation by proteases or difficulties associated with translation. Robust protein expression of the PSMA-binding peptide as a fusion to MBP was observed. Isolation was simplified by the affinity of MBP for amylose resin in column purification. The eluted protein was then purified by cation exchange chromatography, using the positively charged residues as a tag. Tobacco etch virus (TEV) proteolysis followed, to remove the MBP fusion via cleavage of an encoded TEV protease recognition site at the N-terminus of the 1-(KR)14 peptide. SDS-PAGE analysis of the completed proteolysis reaction indicated the MBP 1-(KR)14 fusion was successfully cleaved, noted by a shift in the location of the MBP band. The resulting peptide wraps the phage and amplified the binding of phage to PSMA.

Both peptide 1 [SEQ ID NO.2] and the K14 peptide were synthesized separately via solid-phase peptide synthesis. After additional coupling of 4-pentynoic acid to K14, and 4-azido-butanoic acid to peptide 1 [SEQ ID NO.2], the two peptides were coupled via [3+2] cycloaddition reaction to provide the desired fusion product 1-K14 (termed peptide 10 in the Figures). After HPLC purification, as well as characterization by MALDI-TOF analysis, the fusion product was isolated in pure form.

Figure 3:
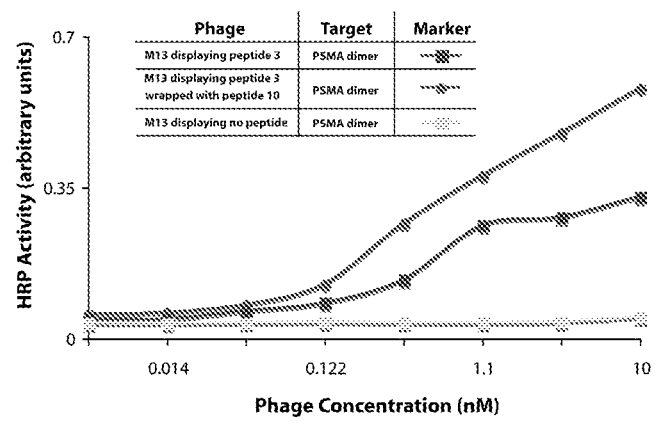
FIG. 3 is a graph illustrating exemplary binding results for enhanced PSMA ligand binding using two distinct ligand motifs.
Figure 4:
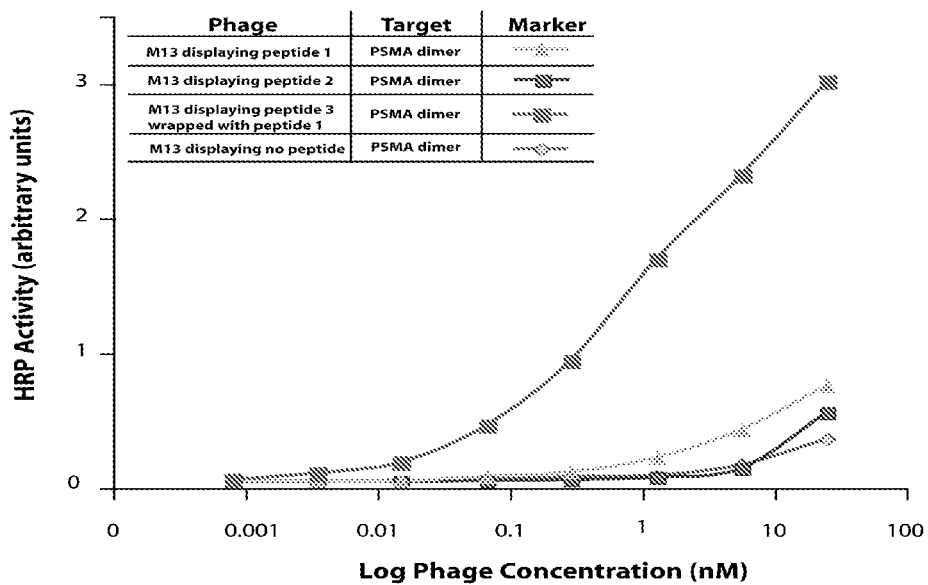
FIG. 4 is another graph illustrating exemplary binding results for enhanced PSMA ligand binding using two distinct ligand motifs.

A phage-based ELISA was performed using purified peptide 10 to determine whether the peptide enhances the binding to immobilized PSMA. The results obtained demonstrated that phage displaying peptide 3 [SEQ ID NO.4] coated with 1-K14, binds with a 16 times higher affinity than the uncoated phage as can be taken from FIG. 3. Here, the graph illustrates results for the phage displaying peptide 3 [SEQ ID NO.4], wrapped with peptide 10 binding 1 µg/mL PSMA dimer It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A recombinantly produced or synthetically produced PSMA binding reagent comprising a PSMA binding peptide having the sequence $X_1X_2CVEVX_3QNSCX_4X_5$ [SEQ ID NO: 2], wherein $X_1$ to $X_5$ are independently a natural amino acid or a non-natural amino acid, or having the sequence CALCEFLG [SEQ ID NO: 1] covalently linked either directly or indirectly to one or more moieties selected from the group consisting of an imaging contrast agent, an enzyme, a toxin, a detectable label, a protecting group, a therapeutic moiety, and a solid phase.

2. The recombinantly produced or synthetically produced PSMA binding reagent of claim 1 comprising a peptide having the sequence selected from the group consisting of CALCEFLG [SEQ ID NO: 1], LDCVEVFQNSCDW [SEQ ID NO: 3], SECVEVFQNSCDW [SEQ ID NO: 4], SDCVEVFQNSCDW [SEQ ID NO: 5], LECVEVYQN-SCEW [SEQ ID NO: 6], SECVEVFQNSCEL [SEQ ID NO: 7], and SDCVEVYQNSCDW [SEQ ID NO: 8].

3. The recombinantly produced or synthetically produced PSMA binding reagent of claim 1 wherein $X_1$ is an amino acid with a linear side chain, wherein $X_2$ and $X_4$ are independently an amino acid with a charged side chain, wherein $X_3$ is an amino acid with an aromatic moiety the side chain, and wherein $X_5$ is an amino acid with a non-polar and a hydrophobic side chain.

4. The recombinantly produced or synthetically produced PSMA binding reagent of claim 1 wherein $X_1$ is an amino acid with a linear and uncharged side chain, wherein $X_2$ and $X_4$ are independently an amino acid with a polar and charged side chain, wherein $X_3$ is an amino acid with an aromatic and uncharged moiety in the side chain, and wherein $X_5$ is an amino acid with a non-polar and hydrophobic side chain.

5. The recombinantly produced or synthetically produced PSMA binding reagent of claim 1 wherein $X_1$ is serine or leucine, wherein $X_2$ and $X_4$ are independently aspartic acid or glutamic acid, wherein $X_3$ is phenylalanine or tyrosine, and wherein X5 is leucine or tryptophan.

6. The recombinantly produced or synthetically produced PSMA binding reagent according to claim 1, wherein the label is selected from the group consisting of an isotope label, a chemiluminescent label, a fluorescent label, an imaging contrast label, an ultrasound detectable label, and an affinity label.

7. The recombinantly produced or synthetically produced PSMA binding reagent according to claim 1, further comprising a protease recognition site between the peptide having the sequence $X_1X_2CVEVX_3QNSCX_4X_5$ [SEQ ID NO: 2] or the sequence CALCEFLG [SEQ ID NO: 1] and a peptide affinity marker or a peptide detection marker.

8. The recombinantly produced or synthetically produced PSMA binding reagent according to claim 1, wherein the solid phase is selected from the group consisting of a wall of a fluid container, a synthetic insoluble particle, a liposome, a filter membrane, an addressable array, a virus electrode, a surface plasmon resonance chip, and a colored bead.

9. A method of imaging cells or tissue expressing PSMA in a subject, comprising:
    delivering to said subject a diagnostic composition comprising the PSMA binding reagent according to claim 1 suitable for in vivo imaging; and
    performing in vivo imaging to obtain images of a body area of interest on said subject.

10. The method of claim 9 wherein the imaging method is selected from the group consisting of ultrasound imaging, radiographic imaging, or magnetic resonance imaging.

11. A diagnostic reagent for at least one of detection and quantification of PSMA in a sample, comprising:
    a first PSMA binding reagent according to claim 1 comprising at least one of a solid phase and a detectable moiety;
    wherein the peptide having the sequence $X_1X_2CVEVX_3QNSCX_4X_5$ [SEQ ID NO: 2] or the sequence CALCEFLG [SEQ ID NO: 1] is coupled to the solid carrier, or wherein the peptide having the sequence $X_1X_2CVEVX_3QNSCX_4X_5$ [SEQ ID NO: 2] or the sequence CALCEFLG [SEQ ID NO: 1] is coupled to, or part of, the detectable moiety.

12. The diagnostic reagent of claim 11 wherein the peptide having the sequence $X_1X_2CVEVX_3QNSCX_4X_5$ [SEQ ID NO: 2] is selected from the group consisting of LDCVEVFQNSCDW [SEQ ID NO: 3], SECVEVFQNSCDW [SEQ ID NO: 4], SDCVEVFQNSCDW [SEQ ID NO: 5], LECVEVYQNSCEW [SEQ ID NO: 6], SECVEVFQNSCEL [SEQ ID NO: 7], and SDCVEVYQNSCDW [SEQ ID NO: 8].

13. The diagnostic reagent of claim 11 further comprising a second PSMA binding reagent.

14. The diagnostic reagent of claim 13 wherein the second PSMA binding reagent has a different peptide from the first PSMA binding reagent, and the different peptide has a sequence selected from the group consisting of CALCEFLG [SEQ ID NO: 1], LDCVEVFQNSCDW [SEQ ID NO: 3], SECVEVFQNSCDW [SEQ ID NO: 4], SDCVEVFQNSCDW [SEQ ID NO: 5], LECVEVYQNSCEW [SEQ ID NO: 6], SECVEVFQNSCEL [SEQ ID NO: 7], and SDCVEVYQNSCDW [SEQ ID NO: 8].

15. The diagnostic reagent of claim 13 wherein the first PSMA binding peptide preferentially binds a monomeric PSMA, and wherein the second PSMA binding peptide preferentially binds a dimeric PSMA.

16. A method of detecting or quantifying PSMA in a sample, comprising:
    contacting the sample with the diagnostic reagent of claim 11 under conditions to allow binding of the first PSMA binding reagent to a PSMA in the sample; and
    detecting binding of the diagnostic reagent to the PSMA in the sample with at least one of the detectable moiety and a labeling agent.

17. The method of claim 16 wherein the sample is a tissue section or a body fluid, and wherein the step of contacting is performed by adding the diagnostic reagent onto the tissue section or by injecting the diagnostic reagent into the body fluid.

18. The method of claim 16 wherein the labeling agent is an anti-PSMA antibody.

\* \* \* \* \*